United States Patent
Blanco et al.

(10) Patent No.: US 9,263,002 B2
(45) Date of Patent: Feb. 16, 2016

(54) APPLICATION AND USER INTERFACE FRAMEWORK INTERACTION

(75) Inventors: Leonardo Esteban Blanco, Redmond, WA (US); Michael I. Borysenko, Redmond, WA (US); John Gossman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 13/308,307

(22) Filed: Nov. 30, 2011

(65) Prior Publication Data

US 2013/0135340 A1    May 30, 2013

(51) Int. Cl.
*G09G 5/39* (2006.01)
*G06F 9/44* (2006.01)
*G09G 5/34* (2006.01)
*G06T 11/60* (2006.01)

(52) U.S. Cl.
CPC ............. *G09G 5/39* (2013.01); *G06F 9/4443* (2013.01); *G06T 11/60* (2013.01); *G09G 5/34* (2013.01); *G09G 2354/00* (2013.01)

(58) Field of Classification Search
CPC ..... G06F 9/4443; G06F 3/048; G06F 17/212; G06F 17/217; G06T 2200/24; G06T 11/60; G09G 2354/00; G09G 5/34
USPC ........................................................ 345/619
See application file for complete search history.

(56) References Cited

U.S. PATENT DOCUMENTS

| | | | | |
|---|---|---|---|---|
| 5,581,670 | A * | 12/1996 | Bier et al. | 715/856 |
| 5,734,915 | A * | 3/1998 | Roewer | 715/202 |
| 5,818,446 | A * | 10/1998 | Bertram et al. | 715/746 |
| 5,956,737 | A * | 9/1999 | King et al. | 715/202 |
| 6,199,082 | B1 * | 3/2001 | Ferrel et al. | 715/205 |
| 6,626,958 | B1 * | 9/2003 | McCauley et al. | 715/210 |

(Continued)

FOREIGN PATENT DOCUMENTS

JP        2009163567 A  *  7/2009

OTHER PUBLICATIONS

"Optimizing WPF Application Performance", Retrieved on: Aug. 11, 2011, Available at: http://msdn.microsoft.com/en-us/library/aa970683(v=vs.85).aspx.

(Continued)

*Primary Examiner* — Michelle Sams
(74) *Attorney, Agent, or Firm* — Timothy Churna; Leonard Smith; Micky Minhas (57) ABSTRACT

Interaction between an application, a user interface framework, and a graphics module to render a portion of an application surface. The application requests a surface corresponding to a particular range of the application surface from the user interface framework. In response, the user interface framework provides the requested ranged surface to the application. The application instructs the graphics module to populate the ranged surface by drawing into the ranged surface. The application then instructs the user interface framework to compose the ranged surface using the drawn ranged surface and other information available to the user interface framework. The user interface framework composing a composed surface using the drawn surface provided by the application, and additional information available to the user interface framework. The user interface framework may cache information from previously composed surface to allow for faster re-rendering should those portions later come into view on the display.

20 Claims, 5 Drawing Sheets

(56) References Cited

U.S. PATENT DOCUMENTS

| | | | |
|---|---|---|---|
| 7,580,079 B2* | 8/2009 | Miyoshi | 348/563 |
| 7,581,176 B2 | 8/2009 | Wilson | |
| 2002/0186251 A1* | 12/2002 | Himmel et al. | 345/784 |
| 2003/0137522 A1* | 7/2003 | Kaasila et al. | 345/619 |
| 2003/0226113 A1* | 12/2003 | Altman | G06F 17/242 715/249 |
| 2004/0216056 A1* | 10/2004 | Tootill | 715/786 |
| 2005/0097458 A1* | 5/2005 | Wilson | 715/517 |
| 2006/0050287 A1* | 3/2006 | Kobashi | G06F 17/248 358/1.2 |
| 2006/0253795 A1* | 11/2006 | Titov et al. | 715/786 |
| 2009/0066722 A1* | 3/2009 | Kriger et al. | 345/619 |
| 2010/0153544 A1* | 6/2010 | Krassner et al. | 709/224 |

OTHER PUBLICATIONS

"Create a Flex Component", Published on: Jul. 28, 2009, Available at: http://download.boulder.ibm.com/ibmdl/pub/software/dw/web/wa-flexrendering/wa-flexrendering-pdf.pdf.

"JavaScript Thumbnail and Media Viewer", Retrieved on: Aug. 11, 2011, Available at: http://highslide.com/doc.php.

"Class ScrollView", Retrieved on: Aug. 11, 2011, Available at: http://www.blackberry.com/developers/docs/6.0.0api/net/rim/device/api/ui/ScrollView.html.

"Open GL Frame Buffer Object (FBO)", Retrieved on: Aug. 11, 2011, Available at: http://www.songho.ca/opengl/gl_fbo.html.

* cited by examiner

APPLICATION AND USER INTERFACE FRAMEWORK INTERACTION

BACKGROUND

The functionality of many computer applications involve the display of information to allow such information to be conveyed to a user. Such applications often include an application surface that extends beyond the visible bounds of the display. Such is common, for instance, in word processing applications, in which the entire document may not be viewable simultaneously within a display, or a web browser application in which the entire web page may be larger than the viewable area of the display. In such cases, the display is typically provided with some type of navigation control (such as scroll bars) that allows the user to navigate throughout the application surface.

Typical systems for drawing graphical user interfaces persists each element on the display and allows each element to be independently addressable. This does require, however, some processing and memory for each element. This content may also extend beyond the visible bounds of the screen, in which case, for efficiency purposes, only the visible content is rendered.

BRIEF SUMMARY

At least one embodiment described herein relates to interaction between an application, a user interface framework, and a graphics module to render a portion of an application surface. The application requests a surface corresponding to a particular range of the application surface from the user interface framework. In response, the user interface framework provides the requested ranged surface to the application. The application instructs the graphics module to populate the ranged surface by drawing into the ranged surface. The application then instructs the user interface framework to compose the ranged surface using the drawn ranged surface and other information available to the user interface framework. The user interface framework composing a composed surface using the drawn surface provided by the application, and additional information available to the user interface framework. Such additional information may include cached information regarding previously composed surfaces.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an application, a user interface framework and a graphics module interact to render a portion of an application surface in which perhaps only a portion of the application surface may be visible in a display at any given time. The application requests a surface corresponding to a particular range of the application surface from the user interface framework. In response, the user interface framework provides the requested ranged surface to the application. The application instructs the graphics module to populate the ranged surface by drawing into the ranged surface. The application then instructs the user interface framework to compose the ranged surface using the drawn ranged surface and other information available to the user interface framework. The user interface framework composes a surface using the drawn surface provided by the application, and additional information available to the user interface framework.

The user interface framework may cache information from previously composed surface to allow for faster re-rendering should those portions later come into view on the display. Furthermore, this allows for an application to use a graphics module while still being availed of the additional functionality that may be offered by the user interface framework. First, some introductory discussion regarding computing systems will be described with respect to FIG. 1. Then, the embodiments of the interaction will be described with respect to FIGS. 2 through 7.

Figure 1:
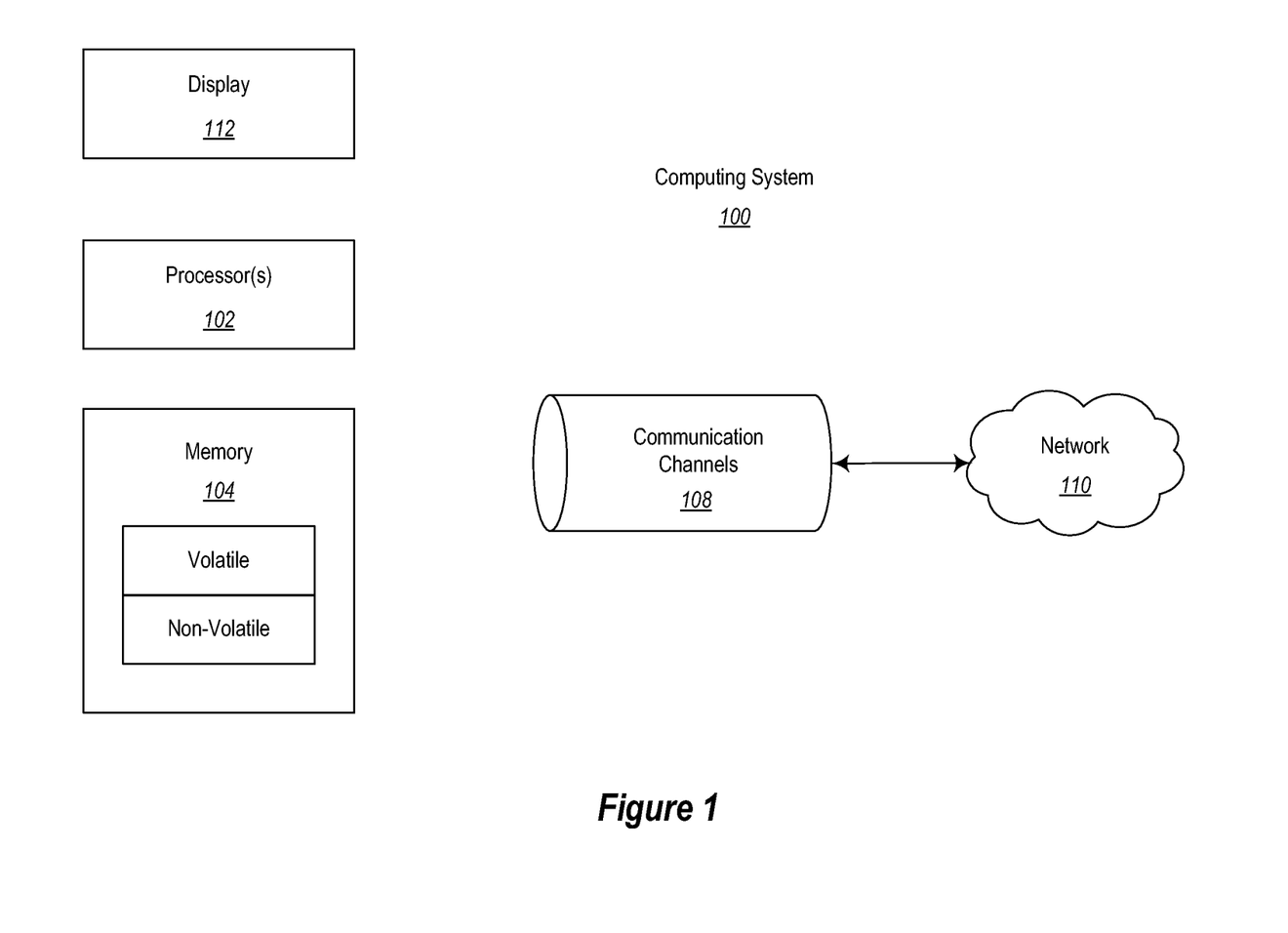
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory"

may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
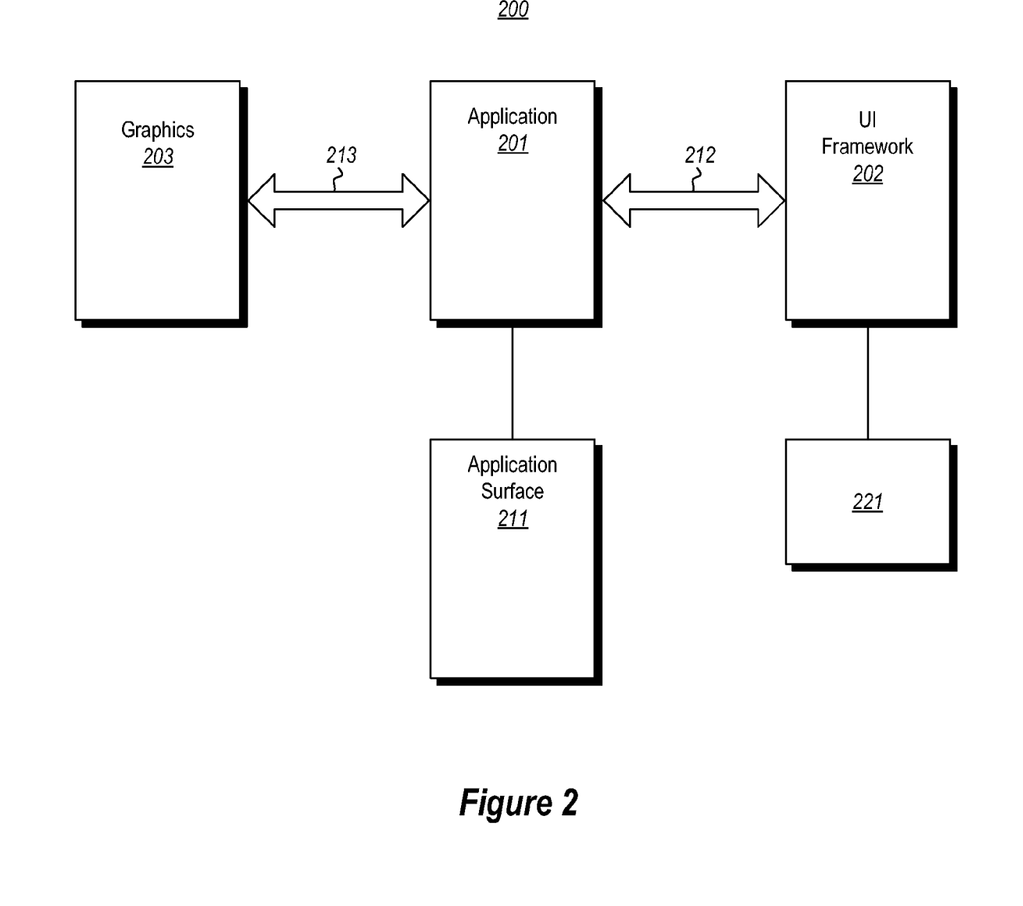
FIG. 2 illustrates an environment that includes an application interacting with a user interface framework, and a graphics module.

FIG. 2 illustrates an environment 200 that includes an application 201, a user interface framework 202 and a graphics module 203. The application 201 is capable of communication with the user interface framework 202 as represented by communication channel 212. The application 201 is also capable of communication with the graphics module 203 as represented by communication channel 213.

The application 201 generates an application surface 211. The size and nature of the application surface 211 will depend on the size and nature of the display object of the application 201. For instance, if the application 201 were a word processing document, the application surface 211 would be a surface that represents the entire document, even if the entire document is too large to fit within the scope of the display. If the application 201 were a web browser, the application surface 211 would be a web page, even if the entire web page is too large to be simultaneously displayed. If the application surface 201 is larger than the display (e.g., display 112 of FIG. 1) then there may be some type of navigation control (whether a visualized navigation control or otherwise) that allows the user to navigate to various parts of the application surface 201.

The user interface framework includes cache 221. The cache 221 may be used to cache composed surfaces, and will be described in further detail hereinafter.

The application 201, the user interface framework 202, and the graphics module 203 may be present on the same computing system, although one or more of these three components may alternatively be present on separate computing systems, so long as there is a communication channel 212 present between the application 201 and the user interface framework 202, and a communication channel 213 between the application 201 and the graphics module 203. The communication channels 212 and 213 may be, for example an application program interface.

One or more and potentially all of the three components 201, 202 and 203 may implemented by a corresponding computer program product. Such a computer program product may have one or more computer storage media having thereon computer-executable instructions that are structured such that, when executed by the one or more processors (such as processors 102 of FIG. 1), cause a computing system (such as the computing system 100 of FIG. 1) to instantiate the corresponding module (e.g., application 201, user interface framework 202, and/or graphics module 203 of FIG. 2) in the one or more memory modules (e.g., memory 104 of FIG. 1). The execution of the computer-executable instructions may perhaps also cause the application 201 to create the application surface 211. The execution of the computer-executable instructions may also cause one or more of the application 201, user interface framework 202, and graphics module 203 to interact as described further herein.

Figure 3:
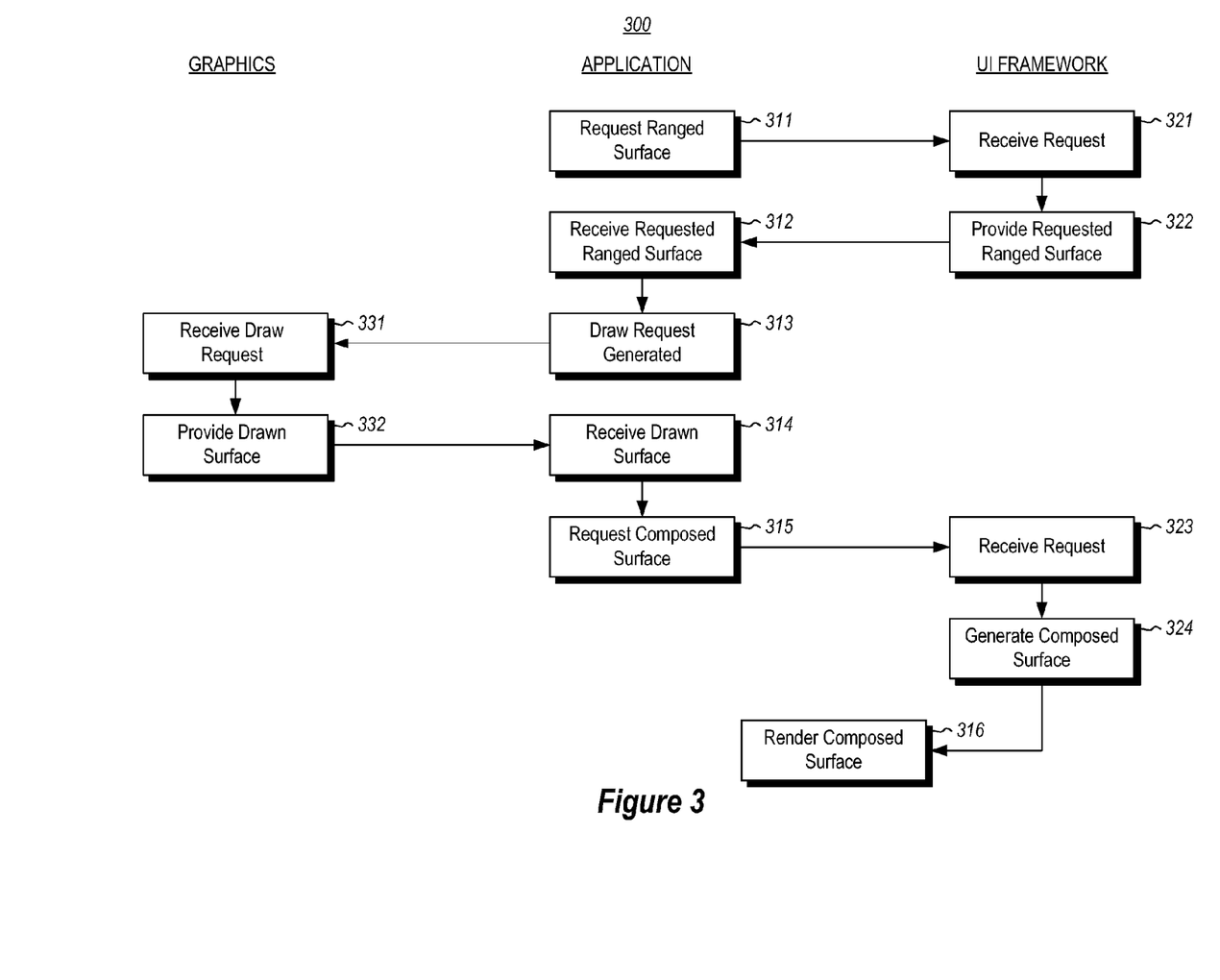
FIG. 3 illustrates a flowchart of a method for an application interfacing with a user interface framework and a graphics module to render a portion of an application surface.

FIG. 3 illustrates a flowchart of a method 300 for an application to interface with a user interface framework and a graphics module to render a portion of an application surface. The method 300 may be performed in the context of the environment 200 of FIG. 2, in which case it is the application 201 that interfaces with the user interface framework 202 via the communication channel 212, and the application 201 that interface with the graphics module 203 via the communication channel 213. Accordingly, the method 300 will now be described with frequent references to the environment 200 of FIG. 2. For instance, acts performed by the application 201 will be illustrated in the middle column of FIG. 3 under the heading "APPLICATION", acts performed by the user interface framework 202 will be illustrated in the right column of FIG. 3 under the heading "UI FRAMEWORK", and acts performed by the graphics module 203 will be illustrated in the left column of FIG. 3 under the heading "GRAPHICS".

The application 201 requests a ranged surface from the user interface framework (act 311). A ranged surface is a surface portion that is not populated with any image data, and is sized to correspond to a particular range of the application surface. For instance, in one example called herein the "application example", suppose that the application surface is 10,000 pixels tall by 800 pixels wide. A ranged surface might a surface that represents a portion of this application surface. For instance, in the application example, the ranged surface may represent the upper-most 600 pixels in vertical range, by the entire 800 pixels in horizontal range in an application example. The ranged surface is just a canvas and is not populated yet by any image data or application elements.

The user interface framework 202 receives the request for the ranged surface from the application (act 321). Several examples of the manner in which the scope of the ranged surface is identified with respect to the currently displayed area will be described hereinafter. However, in one example, the ranged surface does not include all of the displayed area of the application surface. For instance, if the user were to type a letter into an application surface in the form of a word processing document, the ranged surface might be as small as the area directly encompassing that letter. In another example, the ranged surface might include exactly the displayed area of the application surface, in which case the ranged surface would be the same size as the exposed area of the application surface in the display. In a third example, the ranged surface may include all of the displayed area of the application surface in addition to some portion(s) that are not presently displayed. In a fourth example, the ranged surface may include less that all of the displayed area, and some portion(s) that are not displayed. Upon generating the requested ranged surface, the user interface framework provides the ranged surface back to the application (act 322).

The application 201 receives the ranged surface (act 312), and instructs the graphics module 203 to populate the ranged surface by drawing into the ranged surface (act 313). The graphics module 203 then populates the ranged surface to generate a drawn ranged surface (act 331). A "drawn surface" or a "drawn ranged surface" is a surface that is populated by image information (such as a bitmap), but does not yet have any interactivity exposed. The graphics module 203 then provides the drawn ranged surface to the application 201 (act 332).

The application 201 receives the drawn surface (act 314), and instructs the user interface framework to compose to ranged surface (act 315) to generate a composed surface, whereupon the user interface framework 202 receives the request (act 323). The application 201 provides the drawn surface to the user interface framework 202 to allow the user interface 202 to generate the composed surface (act 324). The composed surface integrates the drawn surface with information available to the user interface framework. For instance, the user interface framework may combine the drawn surface with older composed surface, may apply interactivity to various elements in the drawn surface, and so forth.

Once the composed surface is generated (act 324), the user interface framework 202 and the application 201 cooperatively interact to cause at least a portion of the composed surface to be rendered on a display (act 316). As described in further detail later, the user interface framework may also cache portions or all of the composed framework in cases in which those portions may reside outside of the presently displayed area. This allows for such areas to be rendered quickly without having to be redrawn, when those areas of the application surface are again exposed (e.g., due to a navigation operation—such as a scroll).

Figure 4:
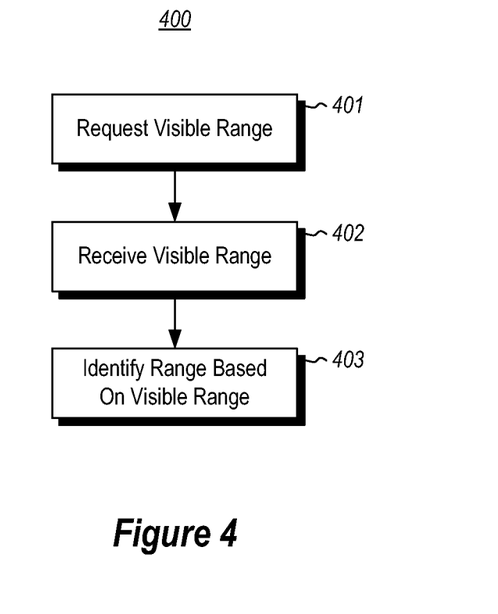
FIG. 4 shows a flowchart of a first example method for how the application may determining the range of the application surface to display.
Figure 5:
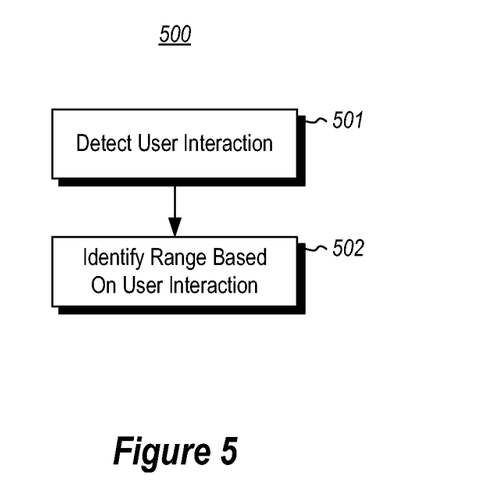
FIG. 5 shows a flowchart of a second example method for how the application may determining the range of the application surface to display.
Figure 6:
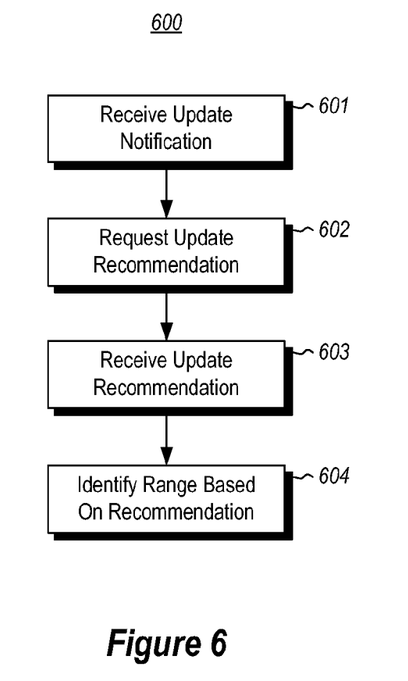
FIG. 6 shows a flowchart of a third example method for how the application may determining the range of the application surface to display.

Although not described with respect to FIG. 3, the application 201 first determines the range of the application surface to be rendered in order to request the proper ranged surface. FIGS. 4 through 6 illustrate three example mechanisms that the application 201 may used to determine the range of the range surface to request.

FIG. 4 shows a first example method 400 of how this range determination may be made. In this case, the application 201 requests the visible range from the user interface framework (act 401). This visible range corresponds to the range of the application surface that is presently being displayed. The user interface framework 202 is aware of the size of the display, and is also aware of which portion of the application surface is presently being displayed. The user interface framework 202 is updated as navigation operations occur, such as if the user were to scroll the display, or jump to a particular location of the application surface.

The user interface framework 203 thus dispatches a notification of the visible range to the application (act 402). The application 201 receives this notification (act 403), and determines the range of the ranged surface to request based on this notification. In one example, the application determines 201 that the range of the ranged surface to be requested is identical to the visible range. This would allow for the presently visible area of the application surface to be rendered first, so that the user is not presented with exposed application surface area that done not have associated application compositions therein. Later, after the visible area is properly composed and rendered, the application 201 might proactively cause off-screen portions of the application surface to be rendered in anticipation of the more likely navigation activity predicted for the user.

FIG. 5 shows a second example method 500 for how this determining of the range may occur. In this case, the user interacts with the application 201 (act 501), and the application 201 determines the range of the ranged surface to requested based on the user interaction (act 502).

As an example, the user interaction might be a typing operation, or some other operation (such as a text formatting operation) that causes only a small portion of the application surface content to change. In that case, the range might be limited to only that portion of the content that changed, cause a small surface to be composed with application content.

Another type of interaction might be a user navigation interaction, or a scrolling interaction. In that case, the application 201 might interface with the user interface framework 202 to determine the range of the ranged surface to request. The principles of FIG. 6 may be used to allow this interaction in which case the user interface framework 202 fires an event to notify the application 201 that the display has exposed an area of the application surface that is not yet populated with application content.

FIG. 6 shows a third example method 600 for how this determining of the range of the ranged surface to request may occur. This method 600 may be performed perhaps in response to a navigation operation in which exposed application surface is displayed that does not have associated application content, or in which case there is rising risk of such exposed area being displayed.

The application 201 receives an update notification from the user interface framework 202 (act 601). For instance, suppose that the application surface is a 100 page document, that the display displays one discrete page at a time, that scrolling operation occurs one discrete page at a time, and that jumping to a particular page is also possible. Suppose further that page 50 is presently being displayed. The user interface may anticipate the following navigation operation have a higher likelihood of occurring: 1) a page scroll up operation, 2) a page scroll down operation, 3) a jump to first page operation, and 4) a jump to last page operation. In this case, the user interface framework may proactively suggest caching of page 49 to allow for faster page scroll up operations should that occur, caching of page 51 to allow for faster page scroll down operations should that occur, caching of page 1 to allow for faster jump to first page operation should that occur, and caching of page 100 to allow for faster jump to last page operation should that occur. In this case, since only page 50 is composed with application content, the user interface framework 202 may dispatch an update notification to the application 201 (act 601).

In response, the application 201 may request an update recommendation from the user interface framework 202 (act 602), and the application 201 would thereby receive an update recommendation from the user interface framework 202 (act 603). Alternatively or in addition, the original update notification may include the recommendation. In this case, the user interface framework might recommend the composition of page 1, page 49, page 51, and page 100. The application might determine the range of the ranged surface to request based on this recommendation (act 604). For instance, the application may determine that page 49 is the range of the ranged surface to compose. Thus, the method 300 may be performed first with respect to page 49, which is simply cached rather than being displayed. The application may also opt to perform the method 300 again for each of page 1, 51 and 100. As scrolling operations occur, the user interface framework may provide further recommendations to 1) populate any exposed areas of the application surface with application content, and 2) anticipate future navigation activity to cache composed surface that are not being displayed presently, but might in the future with higher likelihood.

Figure 7:
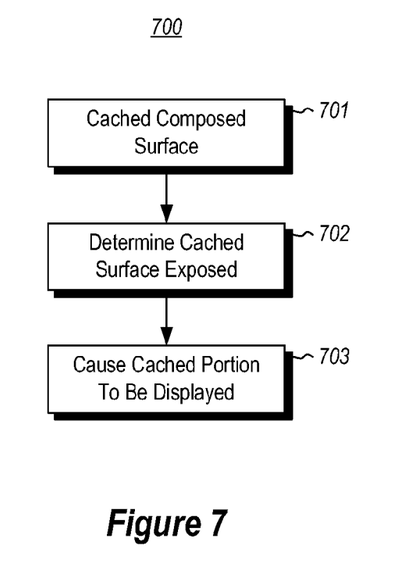
FIG. 7 illustrates a flowchart of a method for the using information cached by the user interface framework to render exposed portions of the application surface.

FIG. 7 illustrates a flowchart of a method 700 for the using information cached by the user interface framework to render exposed portions of the application surface. The method 700 may be performed when the user interface framework caches at least a portion of a composed surface (act 701) generated using the method 300 of FIG. 3. For instance, cached composed surfaces may be cached within the cache 221 of FIG. 2.

The user interface framework later determines that a portion of the application surface corresponding to the cached portion of the composed surface has been exposed (act 702) on the display. The user interface framework then causes the cached portion of the composed surface to be displayed (act 703) without having the application redraw that portion of the application surface. Since the exposed area did not have to be redrawn, the exposed area is populated with application content much more quickly, reducing the time that the exposed area remains exposed.

The principles described herein allow an efficient way for an application to integrate with a user interface framework while continuing to allow the drawing operations to be performed by a graphics module. Functionality provided by the user interface framework (such as caching, and integration of bitmaps with application content and controls) is also enabled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by one or more processors of a computing system, cause an application to perform a method for interfacing with a user interface framework and a graphics module to render a portion of an application surface, the method comprising:

an act of the application requesting a ranged surface from the user interface framework, the ranged surface corresponding to a particular range of the application surface;

an act of the application receiving the requested ranged surface from the user interface framework, the ranged surface being a blank canvas that is not yet populated with any image data or application elements;

an act of the application instructing the graphics module to populate the ranged surface by drawing into the ranged surface;

an act of the application receiving the drawn ranged surface from the graphics module, the drawn ranged surface being populated by image information but not yet having interactivity exposed;

an act of the application instructing the user interface framework to compose the ranged surface using the drawn ranged surface and other information available to the user interface framework to produce a composed surface which integrates the drawn ranged surface with the other information available to the user interface framework and has interactivity applied to at least one element of the composed surface.

2. The computer program product in accordance with claim 1, wherein the method further comprises:
an act of the application using the user interface framework to render the composed ranged surface within the application surface.

3. The computer program product in accordance with claim 1, wherein the method further comprises:
an act of the application determining a range of the application surface to render prior to the act of request the ranged surface.

4. The computer program product in accordance with claim 3, wherein the act of determining a range of the application surface to render comprises:
an act of the application receiving a notification of a visible range from the user interface component, the visible range corresponding to a range of the application surface that is visible on a display.

5. The computer program product in accordance with claim 4, wherein the act of receiving the application receiving the notification of the visible range occurs in response to the following:
an act of the application requesting the visible range from the user interface component.

6. The computer program product in accordance with claim 3, wherein the act of determining further comprises:
an act of the application determining the range based on the visible range.

7. The computer program product in accordance with claim 6, wherein the act of the application determining the range based on the visible range comprises:
an act of the application determining that the range is the visible range.

8. The computer program product in accordance with claim 3, wherein the act of the application determining the range of the application surface to render comprises:
an act of the application detecting user interaction; and
an act of the application determining the range based on the user interaction.

9. The computer program product in accordance with claim 8, wherein the user interaction is a typing interaction.

10. The computer program product in accordance with claim 8, wherein the user interaction is a scrolling interaction, wherein the act of the application determining the range based on the user interaction comprises:
an act of the application interacting with the user interface framework to determine the range.

11. The computer program product in accordance with claim 3, wherein the act of determining the range of the application surface to render comprises:
an act of the application receiving a update notification from the user interface framework;
an act of the application requesting an update recommendation from the user interface framework;
an act of the application receiving the update recommendation from the user interface framework; and
an act of the application determining the range based on the update recommendation.

12. The computer program product in accordance with claim 1, wherein the ranged surface does not include all of the displayed area of the application surface.

13. The computer program product in accordance with claim 1, wherein the ranged surface includes all of the displayed area of the application surface.

14. The computer program product in accordance with claim 1, wherein the ranged surface includes at least one portion of the application surface that is not part of the displayed area of the application surface.

15. A method for a user interface framework to interface with an application to render a portion of an application surface, the method comprising:
an act of the user interface framework receiving a request for a ranged surface from the application, the ranged surface corresponding to a particular range of the application surface;
an act of the user interface framework providing the requested ranged surface to the application, the ranged surface not yet having been populated with any image data;
an act of the user interface framework receiving from the application
1) a drawn surface corresponding to the ranged surface, the drawn surface having been populated by image information by a graphics module but not yet having interactivity exposed, and
2) an instruction to compose the drawn surface to produce a composed surface which integrates the drawn surface with additional information available to the user interface framework; and
an act of the user interface framework composing a composed surface using the drawn surface provided by the application and the additional information available to the user interface framework and has interactivity applied to at least one element of the composed surface.

16. The method in accordance with claim 15, further comprising:
an act of the user interface framework causing at least a portion of the composed surface to be rendered on a display.

17. The method in accordance with claim 15, further comprising:
an act of the user interface framework caching at least a portion of the composed surface.

18. The method in accordance with claim 17, further comprising:
an act of the user interface framework determining that a portion of the application surface corresponding to the cached portion of the composed surface; and
an act of the user interface framework causing the cached portion of the composed surface to be displayed.

19. The method in accordance with claim 18, wherein the act of the interface framework causing the cached portion of the composed surface to be occurs without having the application redrawn that portion of the application surface.

20. A computer system comprising:
one or more processors;
one or more memories;
a display;
a computer program product having one or more computer storage media having there thereon computer-executable instructions that are structured such that, when executed by the one or more processors, cause computing system to 1) instantiate an application and a user interface framework in the one or more memory modules, 2) cause the application to create an application surface, and 3) cause the application and user interface framework to interact as follows:

the application requesting a ranged surface from user interface framework, the ranged surface corresponding to a particular range of the application surface;

in response to the request for the ranged surface, the user interface framework providing the requested ranged surface to the application, the ranged surface not yet having been populated with any image data;

upon the application receiving the requested ranged surface from the user interface framework, the application instructing the graphics module to populate the ranged surface by drawing into the ranged surface;

upon the application receiving the drawn ranged surface from the graphics module, the drawn ranged surface being populated by image information but not yet having interactivity exposed, the application instructing the user interface framework to compose the ranged surface using the drawn ranged surface and other information available to the user interface framework to produce a composed surface which integrates the drawn ranged surface with the other information available to the user interface framework and has interactivity applied to at least one element of the composed surface; and in response to the instruction to compose, the user interface framework composing a composed surface using the drawn surface provided by the application and the other information available to the user interface framework.

* * * * *